United States Patent
Zhan

(10) Patent No.: US 8,899,020 B2
(45) Date of Patent: Dec. 2, 2014

(54) APPARATUS AND METHOD FOR ASSISTING SELECTIVE CATALYTIC REDUCTION

(75) Inventor: Rijing Zhan, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 681 days.

(21) Appl. No.: 11/841,212

(22) Filed: Aug. 20, 2007

(65) Prior Publication Data

US 2008/0041045 A1 Feb. 21, 2008

Related U.S. Application Data

(60) Provisional application No. 60/823,045, filed on Aug. 21, 2006.

(51) Int. Cl.
F01N 3/00 (2006.01)
B01D 53/94 (2006.01)
F01N 3/20 (2006.01)
F01N 3/36 (2006.01)

(52) U.S. Cl.
CPC ........ *B01D 53/9431* (2013.01); *B01D 53/9454* (2013.01); *F01N 3/2066* (2013.01); *F01N 3/36* (2013.01); *B01D 2251/2062* (2013.01); *B01D 2251/2067* (2013.01); *B01D 2251/208* (2013.01); *B01D 2255/20723* (2013.01); *B01D 2255/20769* (2013.01); *B01D 2255/20776* (2013.01); *B01D 2255/50* (2013.01); *B01D 2257/402* (2013.01); *F01N 2610/02* (2013.01); *F01N 2610/03* (2013.01); *F01N 2610/14* (2013.01); *Y02C 20/10* (2013.01); *Y02T 10/22* (2013.01); *Y02T 10/24* (2013.01)
USPC .................. 60/286; 60/295; 60/301

(58) Field of Classification Search
USPC ........ 60/273, 274, 299, 297, 295.3, 301, 324; 422/168; 423/212
See application file for complete search history.

(56) References Cited

U.S. PATENT DOCUMENTS

| | | | | |
|---|---|---|---|---|
| 2,961,304 | A * | 11/1960 | Collins | .......................... 422/217 |
| 4,033,123 | A * | 7/1977 | Masaki et al. | ................... 60/286 |
| 5,165,884 | A | 11/1992 | Martin et al. | |
| 5,296,206 | A | 3/1994 | Cho et al. | |
| 6,003,305 | A | 12/1999 | Martin et al. | |

(Continued)

FOREIGN PATENT DOCUMENTS

| EP | 0487886 | 6/1992 |
|---|---|---|
| EP | 0896831 | 2/1999 |
| JP | 11125110 | 5/1999 |

OTHER PUBLICATIONS

"Urea Selective Catalytic Reduction," Automotive Engineering International (ISSN 0098-2571), Nov. 2000, vol. 108, No. 11 (5 pages).

(Continued)

*Primary Examiner* — Jesse Bogue
(74) *Attorney, Agent, or Firm* — Tucker Grossman et al.

(57) ABSTRACT

The present invention relates to an apparatus and method for vaporizing a fluid to improve performance of a selective catalytic reduction catalyst. A vaporizer including a plurality of flow channels having an increased surface area may facilitate vaporization and mixing of the fluid in, e.g., an engine exhaust or gas containing nitrous oxides. The vaporizer may be located in an exhaust system downstream of a fluid injection site and upstream of a selective catalytic reduction catalyst. The exhaust discharged from the selective catalytic reduction catalyst may have a reduced concentration of nitrogen oxides.

15 Claims, 1 Drawing Sheet

(56) References Cited

U.S. PATENT DOCUMENTS

| | | | |
|---|---|---|---|
| 6,021,639 A * | 2/2000 | Abe et al. | 60/297 |
| 6,074,619 A * | 6/2000 | Schoubye | 423/239.1 |
| 6,290,738 B1 | 9/2001 | Holm | |
| 6,315,969 B1 * | 11/2001 | Yoshida | 423/239.1 |
| 6,401,449 B1 * | 6/2002 | Hofmann et al. | 60/274 |
| 6,401,455 B1 * | 6/2002 | Mathes et al. | 60/286 |
| 6,449,947 B1 | 9/2002 | Liu et al. | |
| 6,516,610 B2 * | 2/2003 | Hodgson | 60/286 |
| 6,553,755 B2 * | 4/2003 | Hofmann et al. | 60/282 |
| 6,601,385 B2 | 8/2003 | Verdegan | |
| 6,663,839 B2 | 12/2003 | Platvoet et al. | |
| 6,905,658 B2 * | 6/2005 | Rogers et al. | 422/172 |
| 6,969,492 B1 * | 11/2005 | Goerigk et al. | 422/177 |
| 7,090,810 B2 * | 8/2006 | Sun et al. | 423/235 |
| 2002/0108368 A1 * | 8/2002 | Hodgson | 60/286 |
| 2005/0013756 A1 | 1/2005 | Amou et al. | |
| 2005/0252201 A1 * | 11/2005 | Lecea et al. | 60/286 |
| 2006/0045835 A1 | 3/2006 | Jacob et al. | |
| 2006/0101811 A1 * | 5/2006 | Linna et al. | 60/286 |
| 2007/0036694 A1 * | 2/2007 | Nishioka et al. | 422/168 |

OTHER PUBLICATIONS

"Letting It Snow with Fewer Emissions," Diesel Progress, North American Edition, Nov. 2002 (3 pages).

* cited by examiner

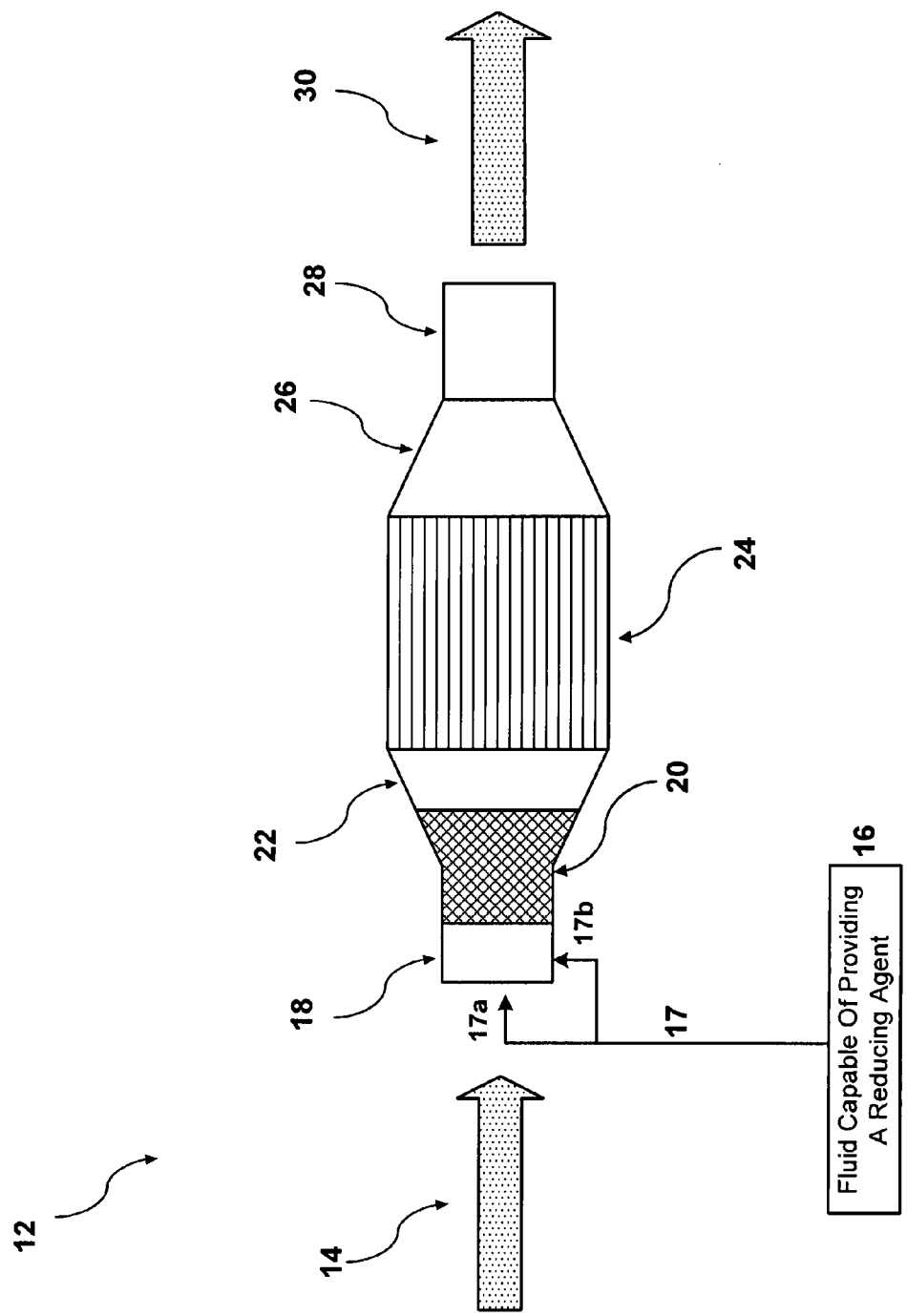

APPARATUS AND METHOD FOR ASSISTING SELECTIVE CATALYTIC REDUCTION

CROSS-REFERENCE TO RELATED APPLICATION

This application claims the benefit of U.S. Provisional Application No. 60/823,045 filed Aug. 21, 2006 which is fully incorporated herein by reference.

FIELD OF THE INVENTION

The present invention relates to an apparatus and method for assisting catalytic reduction such as catalytic reduction of combustion by-products. For example, a fluid capable of providing a reducing agent may be converted in the apparatus to a desired droplet size which may then be combined with the reduction catalyst to improve the efficiency of a chemical reduction reaction applied to gases containing nitrous oxide compounds.

BACKGROUND OF THE INVENTION

Internal combustion engines such as those found in cars and trucks may produce combustion byproducts and/or products of incomplete combustion which may be in the engine exhaust and emitted into the environment. Per emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides ($NO_x$). Accordingly, diesel engines may include selective catalytic reduction (SCR) systems in order to seek reduction in nitrogen oxide concentrations. Improving performance of such systems remains an ongoing area of research and development.

SUMMARY OF THE INVENTION

In exemplary embodiment, an apparatus for assisting catalytic reduction is disclosed comprising an inlet for a fluid capable of providing a reducing agent wherein the apparatus is also capable of mixing the fluid with a compound to be chemically reduced. The apparatus is also capable of receiving droplets of the fluid providing a reducing agent of a first average diameter $\overline{D}_1$ and converting to a second average diameter $\overline{D}_2$ wherein $\overline{D}_2 < \overline{D}_1$. The fluid may itself amount to reducing agent or contain a reducing agent precursor. The apparatus may therefore be part of a gas treatment system or process wherein the gas may contain nitrous oxides.

BRIEF DESCRIPTION OF THE DRAWINGS

The above-mentioned and other features and advantages of the present invention, and the manner of attaining them, will become more apparent and the invention will be better understood by reference to the following description in conjunction with the accompanying drawings, wherein:

FIG. 1 illustrates an exemplary exhaust system for vaporizing a fluid prior to introduction to a selective catalytic reduction (SCR) device to reduce nitrogen oxides ($NO_x$) in engine exhaust.

DETAILED DESCRIPTION OF THE INVENTION

As illustrated in FIG. 1, exhaust system 12 may reduce the concentration of combustion byproducts and/or products of incomplete combustion in initial exhaust 14. Initial exhaust 14 may include the exhaust stream of a diesel engine that relies upon compression ignition. However, the present invention may be understood to be applicable to any type of exhaust, vehicular or otherwise, wherein the control of emissions, such as $NO_x$ emissions, may be desired. For example, exhaust that may be found from the flue gases of boilers, such as boilers used in power generation. Furthermore, the present invention may also be applicable to situations where $NO_x$ may be produced and not necessarily as the output of an exhaust system, but nonetheless desirably converted to other relatively less toxic compounds.

Exhaust products, which therefore serves as one example of a system that produces $NO_x$ emissions, may be understood to include volatile organic compounds (VOCs) such as hydrocarbons ($C_xH_y$) which may contribute to smog formation. Products may also include toxic gases such as carbon monoxide (CO). Products may further include nitrogen oxides ($NO_x$) such as nitric oxide (NO) and/or nitrogen dioxide ($NO_2$), both of which may contribute to smog formation and/or acid rain. Exemplary exhaust system 12 may include one or a plurality of catalyst systems to react such products (i.e., hydrocarbons, carbon monoxide, and nitrogen oxides) to yield the relatively less toxic products of carbon dioxide ($CO_2$), water vapor ($H_2O$), and nitrogen gas ($N_2$).

Fluid 16 may include any media, such as a liquid that is capable of providing a reducing agent. In one exemplary embodiment, fluid 16 may include a reducing agent such as ammonia ($NH_3$). In another exemplary embodiment, fluid 16 may include a reducing agent precursor which may then react with any other compound within the exhaust system 12 to provide a reducing agent compound. Accordingly, a reducing agent herein may be generally understood as any compound that may react with nitrogen oxides ($NO_x$) wherein the nitrogen may loose a bond with oxygen (e.g., the reduction of nitrogen oxides to water and nitrogen gas).

For example, urea ($CO(NH_2)_2$) may serve as an exemplary reducing agent precursor and react with water ($H_2O$) in the presence of a hydrolysis catalyst to yield carbon dioxide ($CO_2$) and ammonia ($NH_3$). The ammonia in turn may act as a reducing agent, as more fully described below. The selection of urea as an exemplary reducing agent precursor to provide the reducing agent of ammonia may therefore be illustrated as follows:

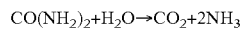

$$CO(NH_2)_2 + H_2O \rightarrow CO_2 + 2NH_3$$

Fluid 16 may be introduced into inlet exhaust pipe 18 in which initial exhaust 14 may be present. For example, fluid 16 may be introduced relatively directly into the exhaust gas stream as shown generally at 17a or it may be injected more peripherally to the flow of exhaust gas at location 17b. It may therefore be understood that the fluid may contain the reducing agent precursor in a mixed (heterogenous) state and/or in a dissolved (solvent/solute) state. For example, in the present invention urea may be mixed or dissolved in water at concentrations between 0.01-50% by weight (wt.), including all values and increments therein. For example, urea may be present in a fluid as a level of between about 30-35% (wt.).

It should be appreciated however, that the fluid 16 may also itself be composed completely of a suitable reducing agent compound. In addition, when introduced, the fluid may assume a particular droplet size characteristic of a given fluid injector device. In the present invention, suitable fluid injector devices may provide droplets of fluid 16 having average diameters of greater than or equal to about 100 microns (μm). However, it should be appreciated that droplets herein should be understood to apply to any geometry of fluid wherein the measurement of diameter (which may be applicable for a generally spherical configuration) may be replaced by measurement of the largest linear dimension.

Both initial exhaust 14 and fluid 16 may flow through an apparatus such as a vaporizer 20. Such vaporizer may be located downstream of the injection site or at any point or points along the length of inlet exhaust pipe 18 and prior to catalyst chamber 24. Vaporizer 20 may then vaporize fluid 16 and/or facilitate mixing of fluid 16 with initial exhaust 14 which may then improve flow and temperature distribution at the inlet to catalyst chamber 24. As used herein vaporize may be understood as that process by which droplets of fluid 16 are decreased in average diameter from the droplet size emerging from the fluid injector 17. Accordingly, the droplets of fluid 16 developed in vaporizer 20 may have a diameter of less than about 100 μm which droplets may then be forwarded to the catalyst chamber 24. It should therefore be appreciated that vaporizer 20 may be capable of receiving droplets of fluid 16 having a first average diameter $\overline{D}_1$ and converting droplets of fluid 16 to a second diameter $\overline{D}_2$ wherein $\overline{D}_2 < \overline{D}_1$.

Vaporizer 20 may be any containment structure including an internal network of surfaces and channels that serve to increase surface area and which facilitates the formation of the smaller droplets noted above. This may therefore occur by physically breaking up the larger droplets into smaller droplets due to the relatively high surface area which may be provided by a plurality of channels within vaporizer 20. Such relatively high surface area may also be selected so that it does not adversely influence overall exhaust gas flow. For example, flow through vaporizer 20 may be maintained at a volumetric flow rate that may be required by a given engine requirement.

The increased surface area within vaporizer 20 may be related to the surface area of the portion of exhaust system 12 in which vaporizer 20 is located. For example, flow through a portion of an exemplary cylindrical exhaust pipe may be exposed to surface area $SA_1$ equal to $(2\pi r)(L)$, where $\pi$ is the known constant of about 3.14, r may represent the inner radius of the exhaust pipe, and L may represent the length of the portion of the exhaust pipe. Vaporizer 20 may be located in that portion of the exhaust pipe and may occupy the same length L. Due to the plurality of flow channels, however, flow through vaporizer 20 may be exposed to surface area $SA_2$, where $SA_2$ may be greater than $SA_1$. For example, $SA_2$ herein may be about 250 square meters per cubic meter ($m^2/m^3$). This increased surface area may therefore facilitate vaporization of fluid 16 and reduction in droplet size, as noted above. Accordingly, vaporizer 20 may function in the absence of a catalyst coating or heat exchanger. Further, injector 17 may now include relatively lower cost injectors having less stringent specifications because the relatively larger average diameter droplets (≥100 μm) may be converted to smaller average diameter droplets by vaporizer 20.

Vaporizer 20 may therefore be relatively compact and the flow channels may be generally parallel to the direction of flow to maintain a relatively low pressure drop across the inlet and outlet of the vaporizer 20. Vaporizer 20 may be formed of metal, ceramic, plastic, or a combination thereof. In one exemplary embodiment, structured packing elements such as those constructed of stainless steel wire gauze may provide such features and offer a relatively low cost addition to exhaust system 12. In another exemplary embodiment, individual flow channels may have hexagonal cross-sections to collectively form a "honeycomb" structure thereby similarly providing an increased internal surface area to vaporizer 20.

Flow channels within vaporizer 20 may also be formed of corrugated sheets. Each corrugated sheet may include two vertical elements and one corrugated element, wherein the corrugated element may be located between the two vertical elements and may reverse the angle of inclination by about 90 degrees upon intersecting either of the two vertical elements. Each point of intersection may provide for mixing of fluid 16 with initial exhaust 14. The corrugated sheets may also be layered by rotating corrugated sheets having vertical elements 90 degrees to provide corrugated sheets having horizontal elements. Then, a plurality of sheets having vertical elements may be located above, below, and/or next to a plurality of sheets having horizontal elements. It should be appreciated, however, that the corrugated sheets are not limited to the embodiment described hereinabove but may be of any design which collectively provides a plurality of flow channels having increased surface area.

Vaporizer 20 may also be located at any point or points along the length of inlet cone 22, which directs flow into catalyst chamber 24. Accordingly, vaporizer 20 may be located downstream of the fluid injection site and upstream of catalyst chamber 24. FIG. 1 illustrates an exemplary embodiment in which vaporizer 20 is provided as one elongated unit located in both inlet exhaust pipe 18 and inlet cone 22. It should be appreciated, however, that vaporizer 20 may be provided as two separate units wherein each unit is located in at least one of inlet exhaust pipe 18 and inlet cone 22. It should further be appreciated that vaporizer 20 may be located in only one of inlet exhaust pipe 18 or inlet cone 22.

A diesel particulate filter (DPF) may also be located in inlet exhaust pipe 18 and/or inlet cone 22 to reduce diesel particulate matter (PM) such as soot. A diesel particulate filter may force initial exhaust 14 through a filter wall to collect particulate matter and clean initial exhaust 14. This may allow catalyst chamber 24 to operate without being clogged by particulate matter.

As alluded to above, exhaust system 12 may include one or a plurality of catalyst systems, represented in FIG. 1 by general catalyst chamber 24. The catalyst within catalyst chamber 24 may include a selective catalytic reduction (SCR) catalyst. As used herein, selective catalytic reduction may be a process by which nitrogen oxides (e.g. NO and/or $NO_2$) are catalytically reduced which reduction may yield the relatively less toxic products of water vapor ($H_2O$) and nitrogen gas ($N_2$). As noted above, the reduction of nitrogen oxides may be achieved by the introduction of ammonia which may be sourced from fluid 16 and provided to catalyst chamber 24 with average droplet sizes of greater than or equal to about 100 μm. The selective catalytic reduction device may include a relatively high surface area (i.e., "honeycomb" structure) coated with a metal based reduction catalyst selected from the group consisting of vanadium, zeolite, molybdenum, tungsten, and mixtures thereof. In the presence of a catalyst, the reducing agent (e.g. $NH_3$) may react with nitrogen oxides (NO and/or $NO_2$) in the engine exhaust to yield the relatively less toxic products of water vapor ($H_2O$) and nitrogen gas ($N_2$). In the exemplary embodiment in which the reducing agent is ammonia, either provided as ammonia or from a precursor (e.g. urea) the reaction may be more specifically illustrated by the following formulas:

$$2NH_3 + NO + NO_2 \rightarrow 2N_2 + 3H_2O$$

$$4NH_3 + 4NO + O_2 \rightarrow 4H_2 + 6H_2O$$

It should also be noted that the invention herein contemplates the use of hydrocarbons to reduce exhaust $NO_x$ emissions via selective catalytic reduction which may be termed hydrocarbon selective catalytic reduction or HC—SCR. HC—SCR may also be termed lean $NO_x$ trapping or absorption. For example, the use of hydrocarbon fuels such as diesel fuel or liquefied petroleum gas may be employed as a source of hydrocarbon reductants which may be utilized herein as applied to an HC—SCR system. Such HC—SCR systems may, e.g., utilize alumina supported silver ($Ag-Al_2O_3$) as the specific catalytic component. As can be appreciated, the use of the aforementioned HC—SCR may avoid the need to supply a separate source of a reductant precursor such as urea as well as residue build-up from unwanted urea or urea decomposition products, which may particularly be the case at low temperatures.

Catalyst chamber 24 may further include a diesel oxidation catalyst (DOC). As used herein, a diesel oxidation catalyst may be any catalyst which may be disposed on a high surface area substrate (i.e., "honeycomb" structure) which may promote a reaction of oxygen with another compound. For example, the diesel oxidation catalyst may react carbon monoxide (CO) with oxygen ($O_2$) to yield carbon dioxide ($CO_2$). The diesel oxidation catalyst may also react hydrocarbons ($C_xH_y$) with oxygen ($O_2$) to yield carbon dioxide ($CO_2$) and water ($H_2O$). Thus, in the presence of such catalysts, carbon monoxide and hydrocarbons in engine exhaust may be oxidized to yield the relatively less toxic products of carbon dioxide and water vapor. These exemplary reactions are illustrated by the following formulas:

$$2CO+O_2 \rightarrow 2CO_2$$

$$C_xH_y+O_2 \rightarrow CO_2+H_2O$$

The reaction products (e.g., carbon dioxide, water vapor, and nitrogen gas) may exit catalyst chamber 24 through outlet cone 26 and outlet exhaust pipe 28 in the form of treated exhaust 30. Treated exhaust 30 may therefore contain reduced concentrations of nitrogen oxides ($NO_x$) as compared to initial exhaust 14. Treated exhaust 30 may also contain reduced concentrations of carbon monoxide (CO) and volatile organic compounds such as hydrocarbons ($C_xH_y$) as compared to initial exhaust 14.

As can now be appreciated, the present invention may provide advantages over the use of a system that fails to recognize the advantages of optimizing the mixing of the fluid capable of providing a reducing agent with, e.g., the exhaust gas 14. As noted, this may be achieved by controlling droplet size of the fluid which is capable of providing a reducing agent and which may therefore allow for optimization of overall flow rates. As therefore may be appreciated clogging of catalyst chamber 24 may now be reduced.

The foregoing description is provided to illustrate and explain the present invention. However, the description hereinabove should not be considered to limit the scope of the invention set forth in the claims appended hereto.

What is claimed is:

1. An apparatus to assist catalytic reduction of a flow of exhaust gas from an engine comprising:
   an inlet to provide droplets of a fluid having a first average diameter $\overline{D}_1$, said fluid comprising a reducing agent and/or a precursor thereof;
   said apparatus to mix said fluid with a compound to be chemically reduced in said flow of exhaust gas and to receive said droplets of said fluid of said first average diameter $\overline{D}_1$ and to convert said droplets to a second average diameter $\overline{D}_2$ wherein $\overline{D}_2 < \overline{D}_1$;
   wherein $\overline{D}_1$ is greater than or equal to about 100 microns and $\overline{D}_2$ is less than 100 microns; and
   wherein said apparatus comprises a plurality of internal flow channels with a surface area of about 250 $m^2/m^3$ to convert said droplets to the second average diameter $\overline{D}_2$, and said apparatus to convert said droplets to said second average diameter $\overline{D}_2$ without said apparatus heating said fluid and while maintaining a volumetric flow rate of exhaust gas from the engine through the apparatus from the inlet to an outlet of the apparatus; and
   wherein the plurality of internal flow channels are arranged such that flow of the fluid through each of the channels is parallel to the channel as the fluid passes through the channel which guides the flow from the inlet to the outlet; and
   wherein the apparatus is provided in the form of two separate units with a first unit located in an inlet exhaust pipe and a second unit located in an inlet cone upstream of a catalyst chamber.

2. The apparatus of claim 1 wherein said apparatus functions in an absence of a catalyst coating.

3. The apparatus of claim 1 wherein said reducing agent precursor is present in said fluid at a level of about 0.01-50% (wt.).

4. The apparatus of claim 1 wherein said reducing agent precursor comprises urea.

5. The apparatus of claim 1 wherein said fluid comprises a hydrocarbon.

6. The apparatus of claim 1 wherein said reducing agent comprises ammonia.

7. The apparatus of claim 1 wherein said apparatus outputs to a catalyst reduction device containing a catalyst capable of reducing nitrogen oxide compounds.

8. The apparatus of claim 7 wherein said catalytic reduction device includes a catalyst comprising a metal selected from the group consisting of vanadium, zeolite, molybdenum, tungsten, and mixtures thereof.

9. An exhaust gas treatment system to treat a flow of exhaust gas from an engine comprising:
   an apparatus to assist catalytic reduction of engine exhaust wherein said apparatus comprises a plurality of internal flow channels with a surface area of about 250 $m^2/m^3$ and is configured to receive engine exhaust including a compound to be chemically reduced and a fluid comprising a reducing agent and/or a precursor thereof, said apparatus to receive droplets of said fluid having a first average diameter $\overline{D}_1$ and to convert said droplets to a second average diameter $\overline{D}_2$ wherein $\overline{D}_2 < \overline{D}_1$ and $\overline{D}_1$ is greater than or equal to about 100 microns and $\overline{D}_2$ is less than 100 microns and to mix said fluid with said exhaust without said apparatus heating said fluid and while maintaining a volumetric flow rate of exhaust gas from the engine through the apparatus from the inlet to an outlet of the apparatus; and
   wherein the plurality of internal flow channels are arranged such that flow of the fluid through each of the channels is parallel to the channel as the fluid passes through the channel which guides the flow from an inlet to the outlet; and
   wherein the apparatus is provided in the form of two separate units with a first unit located in an inlet exhaust pipe and a second unit located in an inlet cone upstream of a catalyst chamber.

10. The system of claim 9 wherein said reducing agent precursor comprises urea.

11. The system of claim 9 wherein said reducing agent comprises ammonia.

12. The system of claim 9, wherein said apparatus outputs to a catalytic reduction device containing a catalyst to reduce nitrogen oxide compounds.

13. The system of claim 12 wherein said catalyst comprises a metal selected from the group consisting of vanadium, zeolite, molybdenum, tungsten and mixtures thereof.

14. A gas treatment process to treat a flow of exhaust gas from an engine comprising:
providing a fluid comprising a reducing agent and/or a precursor thereof;
forming droplets of the fluid comprising a reducing agent and/or a precursor thereof of a first average diameter $\overline{D}_1$;
receiving said droplets of said fluid by an apparatus to assist catalytic reduction of engine exhaust, wherein said apparatus comprises a plurality of internal flow channels with a surface area of about 250 m²/m³, and wherein the plurality of internal flow channels are arranged such that flow of the fluid through each of the channels is parallel to the channel as the fluid passes through the channel which guides the flow from an inlet to an outlet, and wherein the apparatus is provided in the form of two separate units with a first unit located in an inlet exhaust pipe and a second unit located in an inlet cone upstream of a catalyst chamber;
converting said first average diameter $\overline{D}_1$ into a second average diameter $\overline{D}_2$ with said apparatus wherein $\overline{D}_2 < \overline{D}_1$, and wherein $\overline{D}_1$ is greater than or equal to about 100 microns and $\overline{D}_2$ is less than 100 microns without said apparatus heating said fluid and while maintaining a volumetric flow rate of the flow of exhaust gas from the engine through the apparatus from the inlet to the outlet of the apparatus;
mixing a gas containing $NO_x$ with said droplets having said second average diameter $\overline{D}_2$ to form a mixture and exposing said mixture to a reduction catalyst.

15. The gas treatment process of claim 14 wherein said reducing agent precursor comprises urea.

* * * * *